Dec. 23, 1969 W. LOFGREN 3,485,392
HOISTING APPARATUS FOR TRANSPORT VEHICLES
Filed April 12, 1967 3 Sheets-Sheet 3

INVENTOR
WILLIAM LOFGREN

BY *Larson and Taylor*

ATTORNEYS

United States Patent Office 3,485,392
Patented Dec. 23, 1969

3,485,392
HOISTING APPARATUS FOR TRANSPORT VEHICLES
William Lofgren, Tranas, Sweden, assignor to Aktiebolaget Parator, Orebro, Sweden, a corporation of Sweden
Filed Apr. 12, 1967, Ser. No. 630,281
Claims priority, application Sweden, Apr. 13, 1966, 5,000/66
Int. Cl. B60p *1/48;* B66c *23/00*
U.S. Cl. 214—77                                21 Claims

ABSTRACT OF THE DISCLOSURE

A hoisting apparatus adapted to be stationarily mounted on a vehicle for loading large containers onto and off of the vehicle. A pair of spaced hoisting arms each include a main cylinder connected to the vehicle at its lower end and supporting a container holding means at its upper end. Each hoisting arm includes a pair of auxiliary cylinders on each side of the main cylinder. The lower end of one of these auxiliary cylinders is adapted at rest on the ground beside the vehicle. The two auxiliary cylinders alternately push and dampen movement of the main cylinder during the loading and unloading operation.

---

Figure 1:
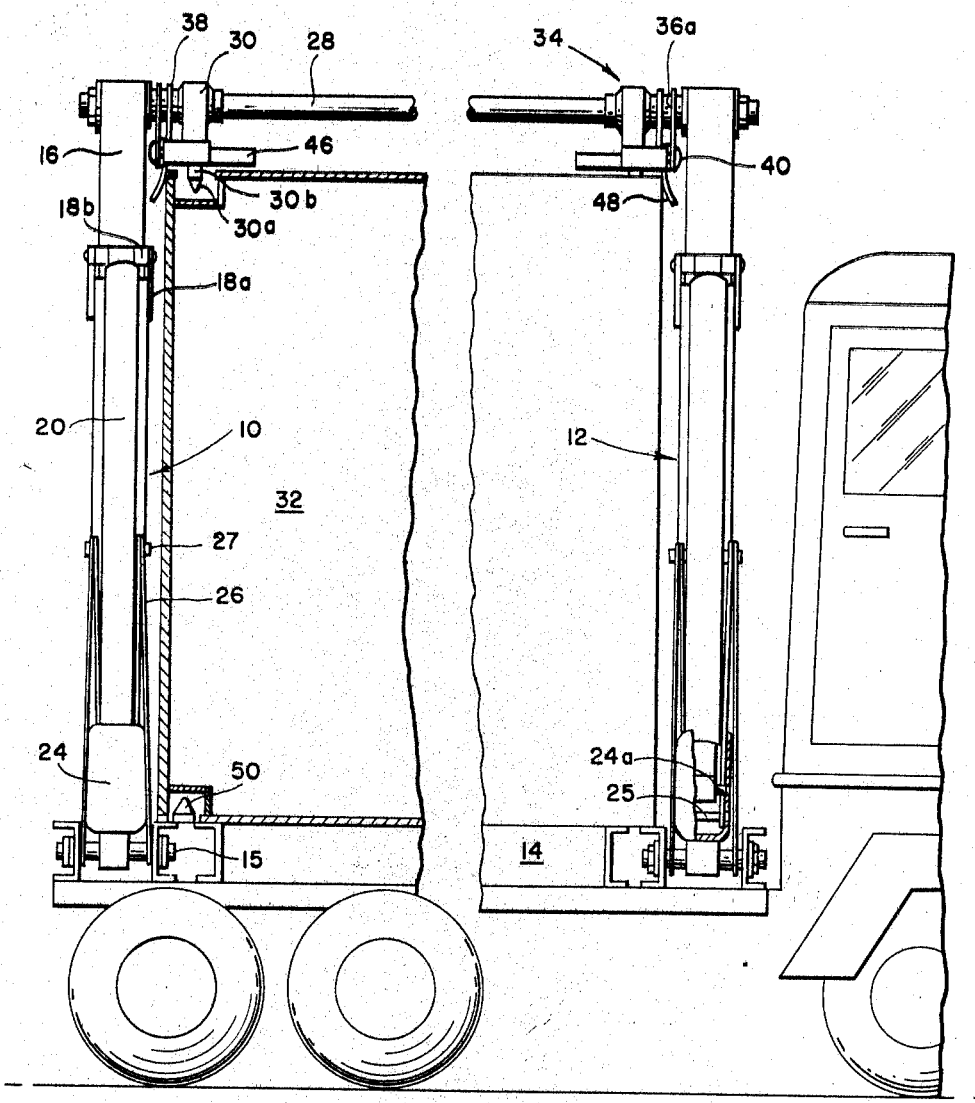

The present invention refers to a hoisting apparatus for handling unit loads in parcels or large transport receptacles or containers, said hoisting apparatus being adapted to be able to be fixed to a transport vehicle such as a motor lorry, a trailer, a railway carriage, a truck or the like, and comprising at least two spaced hoisting arms for lifting and depositing and during transport retaining a transport receptacle, provided symmetrically in pairs.

It has for a long time been an aim to reduce the market price of goods by reducing transporting costs. At the same time, it has been an aim to move goods as rapidly as possible. In conventional transporting methods an essential part of the transporting time is used for transshipment. Thus it has often been necessary to re-load or transship goods a couple of times during its way from the place of extraction of the raw material to the place of its manufacturing or from the manufacturer to the wholesale dealer. These transsshipments demand much time due to the fact, that only small units are being re-loaded at the time, and due to the fact that goods might stand waiting for the loading or unloading persons. Usually these transsshipments demand at least a couple of workers on the transport vehicle, a couple of workers on the loading platform and at least one worker at the hoisting crane, the traverser or the similar means. With the conventional transporting method, it is also necessary to pack the goods so well that they will not be injured during the transports or the transsshipments due to wet, thrusts, blows, careless handling, sun exposure or the like. A further part of the transporting costs consists of the losses in measure, which for various reasons arise during the transports.

It has been tried heretofore to overcome these disadvantages by packing the raw material of the ready made product in large transporting receptacles, usually called containers, at the very place of its manufacturing, said receptacles or containers following the goods as far as possible to its terminus. The transshipment thereby takes place so that the receptacle by means of a crane, a truck or the like is lifted directly onto the vehicle intended for further transportation thereof or eventually to a storing place while waiting for the loading on to said vehicle. With this method considerable time is being spared, which would otherwise have been spent for conventional reloading, and moreover the reloading can often be performed by one single man instead of the large number which were generally necessary when reloading in a conventional manner. Nor need the goods be packed with such a care which is otherwise necessary, and the loss in measure can almost completely be eliminated.

A difficulty in this transporting method however has been to provide sufficient cranes or lifting trucks, that the transporting vehicles would not be obliged to wait for their loading or unloading, and not so seldom it happens, that there is no unloading means at all at the proposed discharge place.

Thus, more and more the transport vehicles are being provided with means for loading and unloading the containers. Hitherto such hoisting arrangements have however been impaired by certain disadvantages. Such hoisting means, which have lifted the container by grabbing it at one single point have not been able to carry the container in a fixed path to and from the vehicle, but rather, the container has tended to oscillate about the point of suspension, and this can cause damage to the crane and vehicle as well as the container and its contents. Furthermore extremely stable and expensive containers and cranes have been necessary for bearing the occuring high loads. A further disadvantage is that the container can normally not be put down softly, but this usually takes place with a thrust, that can hurt the container, the vehicle or the transported goods.

Hitherto known hoisting arrangements having two symmetrically provided hoisting arms for handling a container also possess the disadvantage, that the container cannot be put down softly without a large thrust. Neither are these hoisting arrangements normally adapted for grabbing and setting down the container onto a horizontal surface, which is as high as or possibly higher than the surface whereon the vehicle bears the container.

The present invention intends to avoid said lacks and disadvantages and to provide an automatic hoisting apparatus for handling large transporting receptacles, so called containers, said hoisting apparatus being adapted to be stationary provided on any kind of transport vehicle, and comprising at least two spaced hoisting arms for lifting, depositing and during the transport retaining the container, said hoisting arms being provided symmetrically and in parallel in pairs.

It is of essential importance for the invention that each hoisting arm comprises a preferably hydraulically operated, pivotally mounted main cylinder for carrying the transport receptacle and one preferably hydraulically operated auxiliary cylinder provided on each side of said main cylinder in the pivotal direction thereof and being pivotally attached to same, said auxiliary cylinders alternating acting as pushing means for damping the main cylinder or a regulating and damping means for its motion speed.

The invention will now be further described in respect to a perferred embodiment of the hoisting apparatus according to the invention with reference to the accompanying drawings. It will however be understood that the invention must not be limited to the embodiment thereof thus described and shown in the drawings, but that all kinds of modifications may occur within the frame of the invention.

Figure 2:
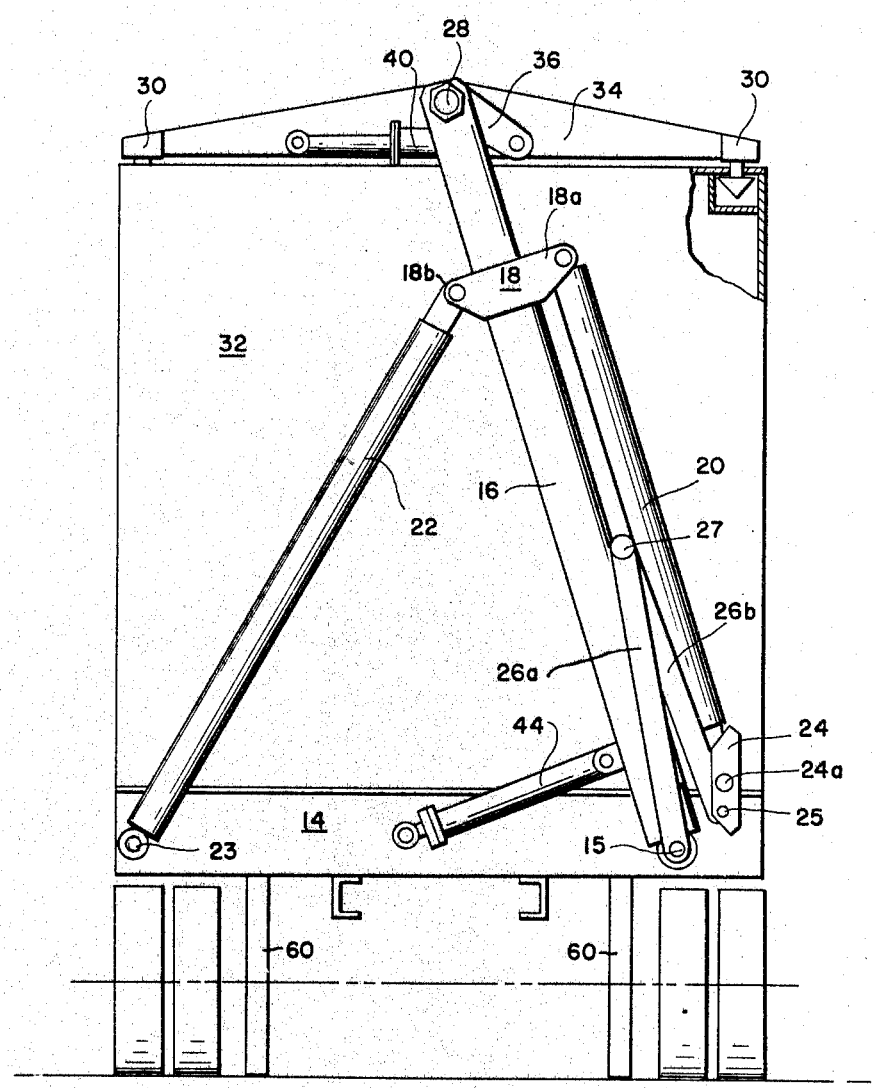
Figure 3:
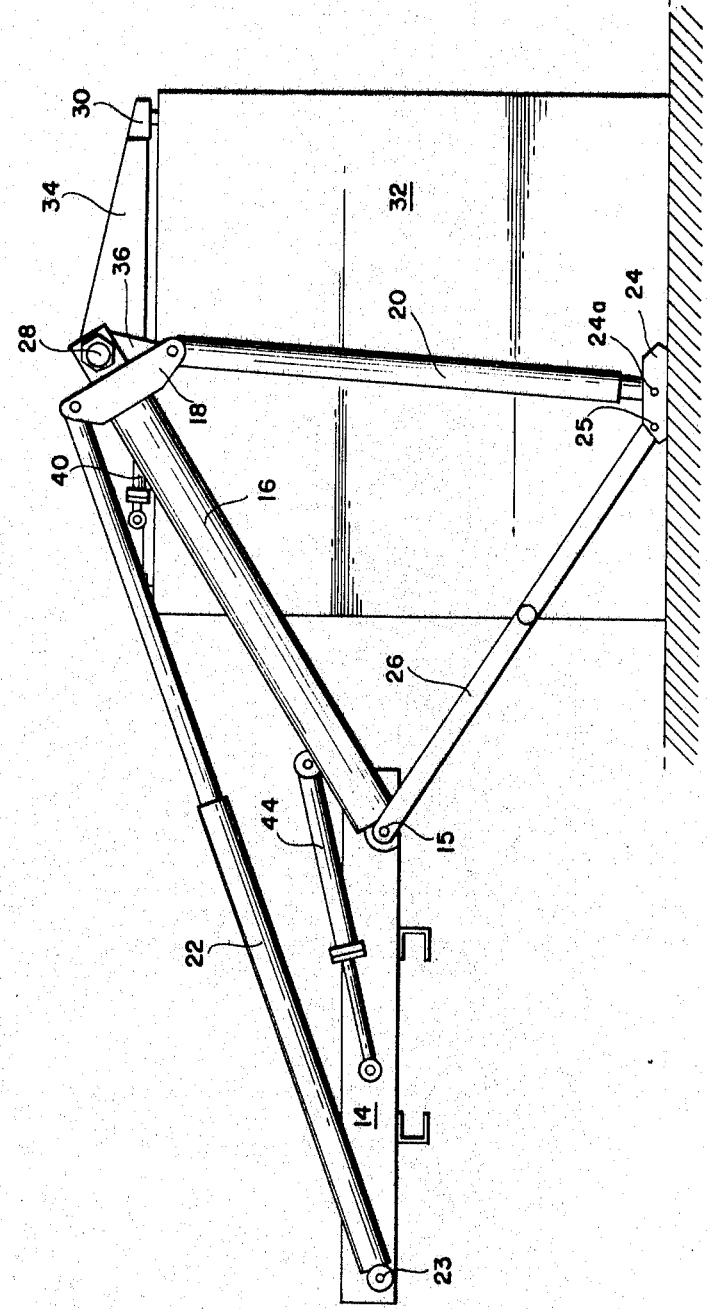

In the drawings FIG. 1 is a diagrammatic elevational view from the side of a hoisting apparatus according to the invention having two hoisting arms, the appparatus being applied to a motor lorry. FIG. 2 shows the hoisting apparatus according to FIG. 1 seen from the left hand side in FIG. 1. FIG. 3 shows the hoisting apparatus according to FIG. 1 and FIG. 2 in a position, where the container is put down on the surface of a floor or the ground.

The embodiment of the invention shown in the drawings comprises an apparatus for loading and unloading a large transport receptacle, usually called a container, said apparatus including two hoisting arms 10 and 12 symmetrically mounted on a motor lorry chassis 14 and adapted to lift a transport receptacle to and from said motor lorry and to retain same during the transportation thereof.

While FIG. 1 shows a motor lorry provided with two hoisting arms and a container carried there-between the invention is applicable to a truck, a trailer, a railway carriage or the like provided with several hoisting arms and a container between each pair of said hoisting arms. A hoisting arm provided between two adjacent containers can thereby be adapted to unload or load one of said containers by turns or the two containers at the same time together with the cooperating hoisting arm provided on the other side of the container.

Since the two hoisting arms 10 and 12 are symmetrical but otherwise identical only one hoisting arm will be described in detail. The hoisting arm comprises a preferably hydraulically operated main cylinder 16, its lower end being pivotally mounted to the wagon chassis 14 of the vehicle around a pivot axle 15. The main cylinder 16 is vertical in a longitudinal elevational view of the lorry, while in transporting position it vertically forms a certain angle with the vertical line of the lorry in the transversal direction thereof. The pivot axle 15 of the main cylinder 16 is positioned at or near the longitudinal edge of the lorry to or from which direction the container is to be loaded or unloaded. The main cylinder 16 is provided with a link joining 18 at or near the upper edge of the cylinder part, said link 18 being composed by two plane and parallel plates 18a, which are essentially longer than the diameter of the cylinder part. These plates, which are connected to the main cylinder 16 are near the outer edges thereof linked together by means of bolts 18b. In these distance bolts 18b a preferably hydraulically operated, auxiliary double acting supporting cylinder 20, as well as a preferably hydraulically operated auxiliary double acting pushing and braking cylinder 22 are pivotally mounted. The pushing and braking cylinder preferably has its piston part attached to one distance bolt 18b of the linking joining 18 while the cylinder part thereof is pivotally mounted on a pivot axle 23 attached to the wagon chassis 14, said pivot axle 23 being positioned at or near the longitudinal edge, which is opposite that edge at which the main cylinder 16 is attached. The support cylinder 20 is preferably with its cylinder part attached to the second distance bolt 18b of the link 18, while the piston part thereof in its lower end is provided with a suitable supporting foot 24 pivotally mounted around a horizontal axle 24a. Said supporting foot 24 is attached to the wagon chassis 14 by means of a supporting link of a knee action type. The supporting link 26 comprises two substantially equal link arms 26a and 26b, each link comprising two parallel bars. Said link arms 26a and 26b are, at one end thereof being pivotally connected to each other by means of a pivot pin 27 of such a length, that the parallel parts of the link arms can pass one on each side of the main cylinder 16 and the supporting cylinder 20. The free outer ends of the link arms 26a and 26b are pivotally mounted, one 26a to the wagon chassis 14, preferably on the pivot axle 15 of the main cylinder 16 and the other 26b on a pivot axle 25 provided in the supporting foot 24, said pivot axle 25 being positioned somewhat aside on the axle 24a connecting the supporting foot 24 to the support cylinder 20. During transport the supporting cylinder 20 will take a position parallel and close to the main cylinder 16, and the supporting foot 24 will take a vertically turned up position, wherein no part of the supporting foot 24 projects outside the outermost part of the transport vehicle or the transported container. This is of great importance, since the foot 24 could otherwise hook on to a passing body and cause damage.

The main cylinders 16 of two cooperating hoisting arms 10 and 12 are joined together by means of a connecting rod 28 to which the upper parts of the piston parts of the main cylinders 16 are mounted. The connecting rod 28 also carries carrier means 30 adapted to interlock in and retain a transporting receptacle 32 from above for the loading and unloading of said receptacle and for retaining the same during transport. The carrier means 30 comprises in the lower part thereof tapered latch plugs or faucets 30a of a rectangular horizontal cross section, said faucets 30a being carried by a thin, cylinder-shaped neck part 30b. The faucets 30a are adapted to be able to be introduced into a rectangular slot in corner boxes of the container 32 of a form corresponding to the form of the faucets 30a, and to be turned 90° around a vertical axis, whereby the long edges of the faucets 30a will be turned into a position extending transversely across the long edges of the rectangular slots, and the faucets 30a will consequently lock in the corner boxes. The carrier means 30 are located at each outer end of a substantially horizontal yoke, which is carried by the connecting rod 28 transversely of the lorry. The yoke 34 is connected to the piston part of the main cylinder 16 by means of an arm 36 attached to same, said arm being composed of two parallel and identical parts 36a with the ends thereof being mounted on a sleeve 38, which in turn is attached to the piston part of the main cylinder 16. The outer end of the arm 36 is arranged to receive a cylinder part of a preferably hydraulically operated balance cylinder 40 between the parallel parts 36a of the arm 36, and the piston part of the balance cylinder 40 is at any point attached to the yoke 34. In this way a locking is established between the cylinders 16 and the yoke 34 with its carrier means 30, and the container 32 is retained by the faucets 30a.

The hoisting arm 10 is further provided with a second hydraulically operated balance cylinder 44 which is connected at one end to the main cylinder 16 with the other end thereof on the wagon chassis 14 and spaced a suitable distance from the pivot axle 15. The two balance cylinders 40 and 44, which are double acting, are communicating, so that movement of one balance cylinder will immediately cause a corresponding but a counter-directed movement of the other cylinder. The two balance cylinders 40 and 44 and the length of their lever arms are so designed, that upon swinging of the main cylinder 16, the yoke 34 and the container 32 will always be parallel to the wagon chassis 14 or, after an adjustment of the balance cylinders 40 and 44, to any other suitable surface.

For making it possible to turn the faucets 30a the carrier means 30 are each provided with a hydraulically or pneumatically operated cylinder 46, the piston rod of which is preferably formed as a rack, which is interconnecting with a gear wheel attached to the faucet axle 30b. When the cylinder 46 is subjected to pressure or subpressure and the piston consequently is moved, the piston rod, being formed as a rack will then turn the faucet 30a. Preferably all cylinders 46 for locking the faucets 30a of one and the same hoisting unit are connected to be operated by one and the same source of power for simultaneous movement thereof.

The carrier means 30 are further provided with a sloping edge 48 running slightly outwards from the container 32, said sloping edges 48 serving to guide the carrier means 30 against a container 32 for guiding the faucets 30a towards the slots of the corner boxes of the container 32. The sloping edges 48 come into contact with the upper edges of the container 32 somewhat before the tapered parts of the faucets 30a reach the slots of the corner boxes. For facilitating the introduction of the faucets 30a in the slots the carrier means may be mounted with some axial play on the connecting rod 28, whereby they will preferably also be adapted to be biassed inwardly against the vertical center line of the yoke 34 by a springy means, when they are not in contact with the container 32.

For retaining the container 32 during transport the wagon chassis 14 is provided with circular tapered pins 50 adapted to protrude into holes provided in corner boxes in the lower part of the container 32.

According to a special embodiment of the invention either one or both of the hoisting arms are displaceable in the longitudinal direction of the transport lorry for making it possible to grab and transport containers of various lengths.

Further, the various carrying and stabilizing pins 30a and 50 can be arranged to be adjustable in the transverse direction of the lorry for making it possible to grab and transport containers 32 having various positioned recesses or slots.

All the power transmitting cylinders of the hoisting apparatus are preferably connected to a joint source of pressure via an adjustable valve system known per se, which is regulated from a control console which serves the entire hoisting apparatus. The valve system is thereby so arranged, that every desired operation can be brought about by a simple adjustment at the control table. In a preferred embodiment of the control table and the regulating valve system, the control table comprises only three regulating keys marked "down" for attaining a movement up-out-down of the hoisting arms, "up" for attaining a movement up-in-down of the hoisting arms and "stop" for immediately ceasing the loading or unloading operation. Further the control table can be provided with a number of keys for separately moving one or more of the cylinders of the hoisting apparatus. These keys however need not normally be used, but they can be used only when the programmed operation for some reason has to be adjusted. The hoisting apparatus may also be provided with supporting legs 60 to be mounted at the wagon chassis 14, said supporting legs being automatically pushed-out at an adjustment of a loading or unloading operation on the key-board, so that the lower ends thereof will come into contact with the surface of the ground or the floor to support the wagon chassis, and they will thereby reduce the canting of the transport vehicle when loading or unloading a heavy container.

The function of the hoisting apparatus will now be further described and as an example will be described with respect to movement of a container from a railway carriage on to a lorry provided with a hoisting apparatus according to the invention. The lorry drives up to the railway carriage and stands alongside the same, a suitable distance therefrom, for example several inches to a couple of feet. The operation starts by the operator pushing down the key of the control table marked "down." Hereby the supporting legs, if there are any, are pushed or let down until they support the wagon chassis by a contact with the surface of the ground or the floor. Then the actual loading operation follows, and the two cooperating hoisting arms are then let out as a unit to fetch the container and move the same to the motor lorry.

This follows in such a way, that the supporting cylinders 20 of the two co-operating hoisting arms 10 and 12 are supplied with pressure medium, whereby the piston is pushed out with the result, that the supporting foot 24 will immediately be turned around its pivot point 24a to take a horizontal position. Upon further movement of the supporting cylinder 20, the pivot pin 27 of the supporting links 26 will push the supporting cylinder 20 out, due to the mounting of the link arm at the wagon chassis 14, and the supporting foot 24 will be put down on the wagon bridge of the railway carriage, when the cylinder 20 has extended to a certain degree. However movement of the cylinder 20 goes on until the supporting links 26 are completely extended.

When this movement has thus stopped pressure is concurrently applied to both the main cylinder 16 and the pushing and braking cylinder 22 and each to such a degree, that the connecting rod is being moved up vertically. From the moment that the main cylinder 16 is extended, by means of the cylinder 22, and the main cylinder 16 to a vertical position, the balance cylinder 44 will at the same time be extended, so that pressure medium in to the extension of the cylinder 44 is transmitted into the second balance cylinder 40 for reducing the length thereof to such a degree, that the yoke 34 will in every moment be kept parallel to its orginal position.

When the yoke 34 has reached a predetermined height the connection between the source of pressure and the main cylinder 16 is cut off, stopping the upward movement of the main cylinder stops, while on the other hand the cylinder 22 continues its pushing movement. The supporting cylinder 20, which, during the whole movement of the yoke 34 has been in contact with the railway carriage via the supporting foot 24, is adapted to damp the movement up-out-down of the yoke 34 during the whole operation, so that the movement thereof will remain constant regardless of the inclination of the main cylinder 16 and the weight of the load.

When the main cylinder 16 has somewhat passed its vertical position the cylinder 22 stops its downward movement, and said cylinder 22 is thereafter supplied with hydraulic oil of atmospheric pressure so as to follow the continued movement without affecting same.

If now the distance between the lorry and the railway carriage and the height of the platform of said railway carriage in relation to the height of the lorry platform are the correct ones or in other words if the pivot radius of the main cylinder 16 is the right one, the locking pins or faucets 30a of the carrier means will hit the openings of the corner boxes of the container 32 and be forced into said openings.

If on the other hand the pivot radius of the main cylinder 16 is not the correct one, it is possible to change the pivot radius of said cylinder 16 by means of special adjustment keys on the control table. The supporting cylinder 20 will then raise the yoke 34 a little bit, so that an adjustment can take place without the faucets 30a hitting the container 32. After this an extension or contraction of the main cylinder 16 takes place together with the cylinder 22, for obtaining a movement up-out or down-in depending on whether the faucets 30a hit the container in front of or in back of the slots of the corner boxes.

When the faucets 30a are positioned in the slots of the corner boxes the movement of the hoisting arms stops automatically, and all valves of the cylinders 16, 20 and 22 are closed, while concurrently the locking cylinders 46 of the carrier means 30 force the faucets 30a to turn 90° about a vertical axis to lock the container to the hoisting apparatus. The movement of the locking cylinders 46 can take place automatically or by means of a manually operated valve.

The load is now ready to be raised and transferred on to the lorry, and this movement begins by the operator pushing the key of the control table marked "up." In doing so the supporting cylinder 20 is supplied with pressure and the main cylinder 16 together with the container 32 carried by the yoke 34 is raised and turned up and in against the lorry about the pivot axle 15 of the main cylinder 16. When the main cylinder 16 has been turned to a vertical position or somewhat behind said position the raising pressure of the supporting cylinder 20 is ceased, and said cylinder 20 will hereafter only be supplied with oil of atmospheric pressure with the result, that it can be extended without impeding the continuing movement, while the supporting foot 24 is still resting against the platform of the railway carriage. At the same time a damping regulating valve is opened both in the main cylinder 16 and in the cylinder 22, said valves being arranged in the same manner as in the case at the beginning of the "down" movement, i.e. so that the yoke 34 with the container suspended therefrom will be after displaced in a parallel manner disposed in and down with a slow and damped movement until the container has reached the position, where the bottom pins 50 are inserted in the bottom corner boxes of the container 32. The cylinder 22 will consequently during this latter movement act as a braking or damping cylinder. When the container 32 has thus been correctly positioned the movement of the main cylinder 16 and the cylinder 22 stop, while the supporting cylinder 20 is supplied with pressure to contract it, until it comes into position parallel to the main cylinder, and the supporting foot 24 will at the same time be turned up to its original vertical position. The valves of all cylinders are now closed, the loading is complete, and the lorry can drive away with its load steadily retained by the pins 30a and 50.

The unloading of the container from the lorry takes place in substantially the same way as the loading thereof. If the container is to be put down on the ground or on a floor, the lorry drives up to the unloading place at a suitable distance therefrom. The operator pushes the key "down" of the key-board, whereby the supporting legs shown schematically at 50 in FIGURE 2 in the downward position are turned down and the supporting cylinder 20 is extended until the supporting foot 24 rests against the surface of the ground or the floor with the supporting links 26 completely extended. Thereafter in the same manner as described above the main cylinder 16 and the cylinder 22 are extended, whereby the yoke 34 and the container 32 carried thereby are raised vertically upwards, so that the bottom pins 50 are released from the corner boxes of the container 32. When the yoke 34 has reached a certain predetermined height the valve of the main cylinder 16 is closed, while the cylinder 22 continues its movement to pushing the main cylinder 16, whereby the container 32 is raised up and out until the main cylinder 16 has reached a position somewhat behind its vertical plane. Then the cylinder 22 is supplied with hydraulic oil of atmospheric pressure, and the supporting cylinder 20, which has during the whole movement damped the same continues its braking operation, so that the container 32 is steadily guided and slowly and carefully put down on the surface of the ground or the floor. Now all movements of the cylinders 16, 20 and 22 stop, while the locking cylinders 46 of the carrier means 30 are operated to release the locking faucets 30a from the corner boxes of the container 32 by turning same an angle of 90°. The faucets 30a can now be lifted out of the slots of the corner boxes as the operator presses the key marked "up," whereby the hoisting apparatus returns to its transporting position on the lorry in the same way as the earlier described loading of the container. Thereby the unloading is finished.

In a preferred embodiment of the invention the fitting of the locking faucets 30a into the slots of a container standing on the ground or on the platform of a railway carriage or the like can be facilitated by making the lower end of the main cylinder displaceable in the transverse direction of the lorry. In that embodiment the pivot axle 15 of the main cylinder 16 is slidably arranged in a groove provided in for instance a transverse beam of the wagon chassis 14, and said pivot axle 15 thereby being suitably adjustable by means of a servo-motor, while the supporting cylinder 20 as well as the pushing and braking cylinder 22 are unactuated whereby the locking faucets 30a will fit into the slots of the container corner boxes.

It thus appears from the specification, that the adjustment of the hoistening apparatus is so simple and demands so little work, that it can easily be handled by one single man. The unloading and the loading also takes place very quick but irrespective of this with such an accuracy and with such care that any damaging due to careless handling at loading or unloading stations can be eliminated. With the present hoisting apparatus it is therefore possible to make considerable savings in damage, loss in measures, packing and the like.

I claim:
1. A hoisting- apparatus adapted to be stationarily mounted on a vehicle for loading and unloading large transport containers onto and off of the vehicle, a part of said apparatus being movable at least between a first position on the vehicle and a second position beside the vehicle, comprising a pair of spaced symmetrical hoisting arms, each hoisting arm comprising an extendable main cylinder, the lower end of the main cylinder being pivotally connected to the vehicle chassis and the upper end of the main cylinder including means for holding the container, and a pair of auxiliary cylinders mounted one on each side of said main cylinder, the lower end of one of said cylinders being connected to the vehicle chassis, the other auxiliary cylinder being movable such that its lower end can rest on the surface beside the vehicle, said auxiliary cylinders being arranged on the vehicle relative to the main cylinder such that they alternatively push the main cylinder and then damp the movement of the main cylinder during movement of the main cylinder between said first and second positions of the apparatus.

2. A hoisting apparatus according to claim 1, the said pivot connection of the lower end of the main cylinder being located close to that edge of the chassis of the vehicle on the side on which the said other auxiliary cylinder can be lowered to the ground.

3. A hoisting apparatus according to claim 2, wherein the said pivot connection of the said one auxiliary cylinder is spaced a certain distance from the said pivot connection of the main cylinder to the chassis of the vehicle.

4. A hoisting apparatus according to claim 1 wherein the said other auxiliary cylinder includes a supporting foot which, during loading or unloading is adapted to rest against the said surface.

5. A hoisting apparatus according to claim 4, wherein the said other auxiliary cylinder is connected to the chassis of the vehicle by means of a supporting link of a knee action type having two parts substantially equal in length, and connected together, one end of the link pivotally interconnected to the said foot and the other end thereof pivotally connected to the vehicle coaxially with the pivot connection of the main cylinder and the vehicle chassis.

6. A hoisting apparatus according to claim 5, wherein the supporting link is connected to the supporting foot at a point situated at such a distance from the pivot connection of the supporting foot to its auxiliary cylinder that the supporting foot in the said first position of the hoisting arm is substantially vertical.

7. A hoisting apparatus according to claim 1, wherein the two cooperating hoisting arms are interconnected by means of a connecting rod firmly attached to the upper ends of the main cylinders.

8. A hoisting apparatus according to claim 7, including a yoke pivotally mounted to the connecting rod between the two cooperating hoisting arms close to each main cylinder.

9. A hoisting apparatus according to claim 8, wherein the yoke is connected to an arm which is attached to the main cylinder by means of a balance cylinder which balance cylinder is in turn attached to a part of said yoke.

10. A hoisting apparatus according to claim 9, including a second balance cylinder attached between the main cylinder and the chassis of the vehicle, said second balance cylinder being in fluid communication with the first balance cylinder so that a change of position of said second cylinder immediately causes a corresponding change of position of the first cylinder so that the said yoke will permanently take one and the same predetermined horizontal position.

11. A hoisting apparatus according to claim 8 wherein each yoke in the outer end thereof is provided with carrier means for a locking engagement of the container.

12. A hoisting apparatus according to claim 11, wherein the yoke is of substantially the same length as the part of the container with which it is adapted to cooperate.

13. A hoisting apparatus according to claim 11, wherein the carrier means comprises a locking faucet of a rectangular cross section, which faucet is attached to the carrier means and is adapted to engage slots provided in corner boxes of the container and is pivotal 90° about a vertical axle to lock the container to the yoke.

14. A hoisting apparatus according to claim 13 wherein each locking faucet includes an actuating cylinder for turning the respective faucet, each cylinder including a piston rod which is formed as a rack, said rack interconnecting a gear wheel attached to the pivot axle of the locking faucet.

15. A hoisting apparatus according to claim 11 wherein the carrier means are provided with sloping edges turned slightly outwards for a sliding contact with the upper edges of the container to facilitate the fitting of the locking faucets in the slots of the corner boxes.

16. A hoisting apparatus according to claim 1, wherein the chassis of the transport vehicle is provided with at least one stabilizing pin adapted to fit into slots of corner boxes in the lower part of the container for horizontally locking the container during transport thereof.

17. A hoisting apparatus according to claim 1, the hoisting arms being pivotally arranged in the transverse direction of the transport vehicle.

18. A hoisting apparatus according to claim 1, either of the two hoisting arms being displaceable in the longitudinal direction of the transport vehicle whereby containers of various lengths can be handled.

19. A hoisting apparatus according to claim 1 including supporting legs on the chassis of the vehicle said legs arranged to be lowered during loading or unloading of the container to support the transport vehicle by contacting the said surface to reduce the canting the the vehicle.

20. A hoisting apparatus according to claim 1 wherein the apparatus comprises more than two hoisting arms, and wherein interpositioned hoisting arms are adapted for interconnecting either of two aligned and adjacent containers separately or both of the two containers at the same time.

21. A hoisting apparatus according to claim 1 including a valve regulating device for regulating power supplied to the cylinders of the hoisting apparatus, said device operatively connected to a key board for operating the various cylinders separately or in connection with each other in accordance with predetermined program.

References Cited

UNITED STATES PATENTS

| | | | |
|---|---|---|---|
| 2,771,197 | 11/1956 | Leffler | 214—77 X |
| 3,057,490 | 10/1962 | Sauer | 214—77 |
| 3,174,630 | 3/1965 | Tantlinger et al. | 212—8 |
| 3,249,235 | 5/1966 | Roberts. | |

GERALD M. FORLENZA, Primary Examiner

R. J. SPAR, Assistant Examiner

U.S. Cl. X.R.

212—8